Patented June 9, 1953

2,641,529

UNITED STATES PATENT OFFICE 2,641,529

PRODUCTION OF MAGNESIA

Leslie W. Austin, San Jose, Calif., assignor to Kaiser Aluminum & Chemical Corporation, Oakland, Calif., a corporation of Delaware No Drawing. Application May 17, 1950, Serial No. 162,609

16 Claims. (Cl. 23—201)

This invention relates to a method of forming crystalline magnesia, or periclase, of high purity and of high density, with decreased effective surface, with the aid of a catalyst which promotes the desired crystallization at much lower temperatures than the art has hitherto been able to employ with magnesia material of like purity.

Magnesium oxide of quite high purity has been very difficult to prepare in the form of well-crystallized pieces or aggregates of low porosity, heating to temperatures in excess of 2000° C. commonly being required for satisfactory crystallization of even the technically pure grade. Since such temperatures are very difficult to attain in fuel-fired furnaces, and since the resulting porosities are higher than is satisfactory for many purposes, crystalline magnesia of purity better than about 95% MgO is ordinarily prepared by fusion in electric furnaces. Such fusion is a difficult process and yields an expensive product which is relatively inert and unsatisfactory for some purposes. For example, unless of extremely high purity, the electrically fused material is difficult to bond together to form satisfactory high temperature ceramic articles.

In order to enable crystallization of the magnesia to take place at lower temperatures, such as those attainable in a rotary kiln, for example, up to about 1800° C., it has been the practice in the art to add to the magnesia, prior to firing, from 5 to 15 percent of impurities, including silica, lime, alumina and iron oxide. These impurities flux with the magnesia, enabling sintering and crystallization to take place at temperatures of from about 1550° C. to 1800° C., depending upon the amount and kind of additives. In such practice, however, the higher temperatures within this range are required to produce a material having low residual shrinkage, that is, less than about 10% porosity.

Although useful in enabling the burning of magnesia at lower temperatures with production of good crystallization, the presence of these large amounts of impurities in the magnesia is objectionable for many purposes. When the crystalline magnesia material is to be used for ceramic or refractory purposes, the impurities markedly reduce the over-all refractoriness of the material, and even more markedly lower its ability to bear load at high temperatures, as well as its resistance to thermal spalling and to corrosion by acidic materials.

An object of this invention is to provide a method for forming crystallized magnesia of increased density and of decreased effective surface. It is also an object of this invention to provide wall-crystallized magnesium oxide of high purity without resorting to fusion or the addition of fluxes. Another object is to provide a method of forming crystalline, high purity magnesia at temperatures attainable in fuel-fired furnaces, such as rotary kilns, and, if desired, at high production rates. A further object is to provide a method whereby formation of crystalline magnesia from magnesia-yielding materials proceeds substantially to completion at much lower temperatures and more rapidly than has heretofore been possible with the magnesia of like purity.

According to the present invention it has now been discovered that the crystallization of magnesia and the formation of well-crystallized magnesia, or periclase, from magnesia material which forms, or yields, periclase upon firing is improved in a catalytic manner by intimately admixing therewith up to 1.5%, calculated as $Al_2O_3$ in the fired product, of an aluminum compound. Mixtures of the aluminum substances can be employed. The intimate mixture of the magnesia starting material and the aluminum compound is then fired until crystallization of the magnesia is substantially complete. The firing can be performed in a rotary kiln, or at equivalent temperatures, with production of a periclase of desirably low porosity.

It has been found that the amounts of the aluminum compounds described below, yielding up to 1.5% additional content of aluminum, calculated as $Al_2O_3$, in the fired magnesia product result in better crystallization of magnesium oxide at a given temperature, or equivalent crystallization at a lower temperature, when compared with similar magnesia fired without such addition. The amount of the element present is calculated as the sesquioxide in accordance with the usual methods of expressing analyses of refractory compounds, but it is not known exactly in what state the element exists in the fired product, as it may be present in another oxide form or as some other compound, such as a spinel, for instance. Sometimes the optimum effect is obtained with only 0.5% of the aluminum substance, calculated as $Al_2O_3$. In general, the more pure the magnesia- or periclase-yielding material, the greater the improvement obtained by this process. It is usually preferred, for the best crystallization and lowest porosities, to add from about 0.5% to about 1.0%, calculated at $Al_2O_3$, on the fired basis, of the aluminum material, when this is the sole additive. The aluminum substance can be added in combination with small, or "catalytic," amounts of other crystallization-promoters, for instance, with chromium compounds, as disclosed in Austin et al., U. S. 2,487,290, or with iron compounds, as disclosed in Austin copending application Ser. No. 101,650 or with both such additives. In such case, a portion of the aluminum material is substituted for by the chromium compound or iron compound, or by both; that is to say, when these substances are added in combination with added aluminum material, the total amount of all these added materials is up to 1.5%, calculated as the sesquioxide, $R_2O_3$, based on the total weight of the fired products.

The magnesia starting material is a magnesium compound which will form, or yield, periclase, crystalline magnesium oxide, upon firing. Such material is employed in finely divided condition, and it includes, for example, magnesium hydroxide, magnesium carbonate, magnesium basic carbonate, magnesium alcoholate, magnesium sulfate, magnesium chloride, etc. A suitable starting material is high-purity natural magnesite or brucite. It is especially advantageous to employ as starting material a precipitated magnesium compound such as magnesium hydroxide, magnesium carbonate or basic carbonate, etc., or cryptocrystalline magnesia. The precipitated compounds are in suitably finely divided condition. The cryptocrystalline magnesia is magnesium oxide which exists in the form of very small crystals, that is, which has not been fired to the form of well-crystallized periclase; in other words, the magnesia crystals are too small or poorly developed to be resolved by the highest power of optical microscope. This is usually known in the art as amorphous or active or caustic magnesia. It is obtained, for example, by firing magnesium carbonate, basic carbonate, hydroxide, etc. to not over about 1200° C. for not over about 45 minutes, or at a higher temperature for a shorter time, or at a lower temperature for a longer time. When these magnesium compounds are so fired, the magnesia formed is not completely shrunken but exists in a cryptocrystalline, or microamorphous, state. When treated according to the present invention, it is improved as to crystal size and porosity. Another suitable starting material is finely divided hydrated magnesia. The magnesia or periclase obtained upon firing any of these starting materials preferably contains at least 95% magnesium oxide and less than 2.0% CaO and less than 2.0% $SiO_2$. Mixtures of these magnesium compounds can be employed. Preferably the magnesium compound starting material is of a particle size to pass through a screen having 100 meshes per linear inch (149 microns diameter), but results are further improved when material passing 200 mesh (74 microns) is employed.

The aluminum material is a compound of aluminum, such as alumina, aluminum hydroxide, aluminum sulfate, alkali metal aluminates such as sodium or potassium aluminate, aluminum chloride or other halide, aluminum phosphate, etc. Mixtures of the aluminum materials or substances can be employed. The aluminum substance is added in thorough and intimate admixture with the magnesia starting material. This can be effected by employing the aluminum compound also in finely divided condition, preferably passing 200 mesh. However, especially good results are obtained by adding the aluminum material in dispersion in a liquid, particularly as a solution or as a colloidal suspension. Preferably, the aluminum material is added as a dispersion in water, especially as a solution therein, but any other liquid can be employed. For instance, aluminum bromide can be added as a solution in alcohol, carbon bisulfide or acetone; and, similarly, other aluminum material can be added in solution in a liquid solvent therefor or as a dispersion in a desired liquid, as, for instance, aluminum hydroxide can be added as a suspension in water. Many of the magnesia starting materials contain appreciable amounts of aluminum, generally reported as the sesquioxide, $Al_2O_3$, but it may be present in solid solution in the MgO or it may be poorly dispersed, or both. Whatever the reason, it does not, as is obvious from the results of firing magnesias of the prior art without separate aluminum additive, have the characteristic effect obtained by means of the present invention. It is to be understood, therefore, that the amounts of aluminum material recited in this specification and claims are the amounts added, and are exclusive of any alumina or aluminum compound present in the magnesia starting material itself. For example, where it is stated that aluminum material is added to provide 1.0% of $Al_2O_3$ in the fired product, this amount is added in addition to whatever amount may be present as impurity in the magnesia starting material, and such provided amount does not mean the total amount of $Al_2O_3$ present in the fired periclase, but only the added amount.

The method of this invention comprises intimately admixing or uniformly interdispersing a finely divided magnesium compound which forms periclase upon firing and up to 1.5%, preferably from about 0.5% to about 1.0%, of aluminum or a compound of aluminum, calculated as $Al_2O_3$ on the fired basis, and firing to form well-crystallized periclase. The aluminum material is employed in a finely divided form, or in solution in a suitable liquid, or dispersed in a suitable liquid. The admixture is fired at a temperature at which shrinkage occurs, for example, at a temperature of at least about 1300° C. However, it is an advantage of the present process that periclase-forming admixtures described herein can be fired to crystallization which will remain stable at temperatures of use, at a temperature about 400° C. below that heretofore required for firing magnesia or periclase of such purity.

By the process of the present invention a denser fired product is obtained as measured in weight per unit volume; and larger crystals of periclase are obtained than when firing the same magnesia or magnesium compound without the addition of the aluminum material as described. The crystals obtained are angular and strong, being approximately equidimensional. The fragments obtained by crushing the larger aggregates are also approximately equidimensional and therefore very suitable for packing well into dense bodies, as in refractory batches. It is a special advantage of this invention that it enables obtaining magnesia material in the form of grains of low porosity and low residual shrinkage.

The mode of carrying out the present invention is more clearly demonstrated by the following examples.

*Example I*

Magnesium hydroxide is obtained by reacting sea water with calcined dolomite to precipitate $Mg(OH)_2$, and the precipitated $Mg(OH)_2$ is washed with fresh water and is filtered. Finely pulverized aluminum hydroxide powder is thoroughly admixed with the filter cake from the above operation, in several batches. In A, no Al(OH)₃ is added; in B, 3.84 grams of Al(OH)₃ are admixed with 996.16 grams of the filter cake (corresponding to 0.25% Al₂O₃ in the fired product); in C, 7.68 grams Al(OH)₃ are mixed with 992.32 grams filter cake (0.5% Al₂O₃, fired basis); in D, 15.35 grams Al(OH)₃ are mixed with 985.65 grams filter cake (0.5% Al₂O₃, fired basis); in D, 15.35 grams Al(OH)₃ are mixed with 984.65 grams filter cake (1.0% Al₂O₃, fired basis), and in E, 23 grams Al(OH)₃ are mixed with 977 grams filter cake (1.5% Al₂O₃, fired basis). Each batch is thoroughly mixed, dried, pressed into briquettes and fired for one-half hour at 1500° C. The porosites of the fired products are: A, 14.2%; B, 10.8%; C, 8.5%; D, 6.6%; and E, 13.0%. By firing a series of similar mixes at 1300° C., and another such series at 1700° C., porosity value curves are obtained which are in general parallel to a curve obtained by plotting the above porosity values obtained by firing at 1500° C. The aluminum compound effects a marked decrease in porosity of the crystalline magnesia, or periclase, obtained upon firing to crystallization equilibrium, when admixed in small amounts, up to 1.5% on the fired basis. After this decrease, with increasing amounts of additive the porosities often tend to rise again or to level off. The grain obtained was hard.

*Example II*

Magnesium hydroxide is obtained as described in Example I, and is divided into several batches. One batch, A, is intimately mixed with 0.296% AlCl₃.6H₂O, corresponding to 1/16% Al₂O₃ on the fired basis; 0.183% FeCl₃. 6H₂O, corresponding to 1/16% Fe₂O₃ on the fired basis; and 0.825% CrO₃, corresponding to 1/16% Cr₂O₃ on the fired basis. After the whole is thoroughly mixed it is pressed into pellets, and the pellets dried, and fired for one-half hour at 1700° C. In a similar manner, batch B is prepared, employing the three additives as used in A, to contain 1/8% of each of the added oxides; Batch C, to contain 1/4% and Batch D, to contain 1/2%, of each of the added oxides. Batch E is a blank and is processed in exactly the same way, but with no added compounds. The porosities of the fired products are: E, 14.3%; A, 8.5%; B, 8.5%; C, 8.5%; D, 8.45%. There is exhibited a sharp decrease in porosity with very low, combined additions. The grain material obtained is extremely hard and tough, and resistant to impact or abrasion.

Instead of drying and pressing, the intimate admixture of periclase-yielding magnesium compound and aluminum compound can be fed directly to a rotary kiln and fired to well-crystallized periclase.

In another variation of this process, particular advantages are obtained by employing a two-stage firing process. In one variant, the starting magnesium compound with the admixed aluminum compound, with or without other "catalytic" crystallization promoters, is calcined to a temperature less than about 1300° C., or preferably to not over about 1200° C., that is to form a mixture which contains cryptocrystalline magnesia, and without effecting substantially complete shrinkage; or, in other words, to convert the magnesium compound of the mixture to cryptocrystalline or active magnesia. Then the calcined mixture is comminuted, pressed and fired at a temperature of at least 1300° C., and preferably at a temperature of from 1500° C. to 1750° C., to form well-crystallized periclase. In another variant, the magnesium compound is calcined to form cryptocrystalline magnesia, and the aluminum compound, with or without other "catalytic" promoters, is admixed with this cryptocrystalline magnesia, or with cryptocrystalline magnesia from any source, and the mixture of magnesia and "catalytic" promoters so obtained is comminuted, pressed and fired as described above, to form well-crystallized periclase. A denser and tougher crystalline product is obtained by pressing cryptocrystalline magnesia in intimate admixture with the aluminum compound, and then firing to form the highly crystallized periclase. Such admixture can be obtained by the methods described above. This practice provides a final periclase of low porosity, and of increased strength, better able to withstand tumbling or handling incidental to use. If desired, there can be mixed with the cryptocrystalline magnesia-containing material up to 90% of finely divided, well crystallized periclase and the mass pressed and fired, preferably at a temperature of at least 1600° C., to obtain an especially dense and strong product. The periclase employed in this step is preferably substantially all of less than 74 microns diameter, and predominantly less than 44 microns. Advantageously at least 10%, and preferably at least 50% is less than 10 microns diameter. The employment of well-crystallized periclase of such particle size, in the manner described, provides a fired product of greater density and which exhibits decreased shrinkage upon firing.

Temperatures other than those shown in the examples can be employed in firing the mixtures to form well-crystallized periclase, according to the invention. The final firing temperature is at least 1300° C. and can be higher. Preferably, a temperature of from about 1500° C. to about 1750° C. is employed. It is an advantage of the invention, therefore, that the mixes can be fired to the well-crystallized state in a rotary kiln, or at an equipment temperature for an equivalent time.

The manner in which the invention functions is not completely understood, but following is one theory of its operation. When periclase-yielding materials, especially precipitated magnesium compounds, which, upon firing or heating, yield magnesia containing at least 95.0% MgO and less than 2.0% CaO and less than 2.0% SiO₂, are so heated as to form crystalline magnesia, very little coalescence or crystal growth occurs and the magnesia crystals obtained are still very finely divided and of extensive surface. As stated above, electric fusion serves to form larger crystals but at high cost, and the addition of fluxing ingredients introduces substantial amounts of impurities which alter the physical and chemical characteristics of the product. The compounds employed herein as crystallization promoters differ in behavior from the fluxing agents in that the optimum amounts of the present compounds are smaller than is the case with fluxing agents, increasing amounts yield higher porosities in many instances, and increasing amounts of other impurities which normally act as fluxing agents, for example, silica, tend to hinder the crystallization-promoting action of the compounds added according to this invention, contrary to the operation of fluxing ingredients. The effect of adding the compounds of this invention is apparently greater on higher purity magnesia material. The action is considered to be a "catalytic" effect because small additions of the compounds noted initiate crystallization more rapidly, and produce better crystallization than is obtained with untreated magnesia. The product obtained, which is dense and tough and exhibits high purity and lower residual shrinkage, is useful in many applications, for instance, in refractories, heat exchange media and abrasives.

Percentages given herein are by weight, except in the case of porosity, which is expressed in percent by volume. The porosity is determined by mercury displacement, employing vacuum to remove entrained air.

In conformity with common practice in reporting chemical analyses of refractory materials, in the specification and claims the proportions of the various chemical constituents present in a material are given as though these constituents were present as the simple oxides. Thus, the magnesium constituent is expressed as magnesium oxide or MgO; the silicon constituent, as $SiO_2$ or silicon dioxide; the aluminum constituent, as $Al_2O_3$ or aluminum oxide and similarly for other elements reported, although the silica or aluminum oxide and a very small portion of the MgO, for example, may be present in combination with each other or with another minor constituent. For example, the term "1.0% by weight of aluminum as, or calculated as, $Al_2O_3$" or "1.0% by weight $Al_2O_3$" is intended to mean that a chemical analysis would show the aluminum content as 1.0% expressed as $Al_2O_3$, although actually all of the aluminum might be present as spinel, $MgO \cdot Al_2O_3$, or in some other combined form.

The term "magnesium compound which yields periclase upon firing," or "magnesia-yielding compound," or "periclase-yielding compound" is intended to include cryptocrystalline or microamorphous magnesia and active or caustic or amorphous magnesia, as well as magnesium compounds which decompose upon heating to form magnesia or periclase; such a compound, for instance, being magnesium hydroxide, magnesium carbonate or basic carbonate, magnesium alcoholate, etc. In conformity with the disclosures in U. S. 2,487,290 and Ser. No. 101,650, referred to above, the chromium material should be intimately admixed with the magnesium compound, either in finely divided condition or as a solution, preferably in water, or the like, and the iron compound should be added as a suspension or solution in a liquid, preferably water.

Having now described the invention, what is claimed is:

1. Process for preparing crystalline magnesia which comprises intimately admixing a finely divided magnesium compound which yields periclase upon firing containing at least 95% MgO and less than 2.0% CaO and less than 2.0% $SiO_2$ and an aluminum compound, said aluminum compound being added in an amount to provide up to 1.5% aluminum as added calculated as $Al_2O_3$, based on the total weight of the fired product, and firing said mixture to form high purity periclase.

2. Process as in claim 1 wherein said aluminum compound is added in an amount to provide from 0.5% to 1.0% aluminum, calculated as $Al_2O_3$, based on the total weight of the fired product.

3. Process as in claim 1 wherein said aluminum compound is aluminum chloride.

4. Process as in claim 1 wherein said aluminum compound is aluminum hydroxide.

5. Process as in claim 1 wherein the aluminum compound is sodium aluminate.

6. Process as in claim 1 wherein the aluminum compound is admixed in solution in water.

7. Process as in claim 1 wherein the magnesium compound is active magnesia.

8. Process as in claim 1 wherein said mixture is fired at a temperature of at least 1300° C.

9. Process as in claim 1 wherein the aluminum compound is partially replaced by an iron compound dispersed in liquid and the aluminum compound remaining is present in a minimum amount of on the order of about $\frac{1}{16}$% aluminum, calculated as $Al_2O_3$, based on the total weight of fired product.

10. Process as in claim 1 wherein the aluminum compound is partially replaced by an iron compound dispersed in liquid and a chromium compound and the aluminum compound remaining is present in a minimum amount of on the order of about $\frac{1}{16}$% aluminum, calculated as $Al_2O_3$, based on the total weight of fired product.

11. Process for preparing crystalline magnesia which comprises admixing a finely divided precipitated magnesium compound which will yield periclase upon firing containing at least 95% MgO and less than 2.0% CaO and less than 2.0% $SiO_2$, and a water dispersion of an aluminum compound in an amount which will provide up to 1.5% $Al_2O_3$ as added, based on the total weight of the fired product, pressing, and firing said mixture to form high purity periclase.

12. In the production of crystalline magnesia by a process wherein a magnesium compound which forms periclase upon firing is fired containing at least 95% MgO and less than 2.0% CaO and less than 2.0% $SiO_2$ in intimate admixture with a small amount of aluminum compound, the steps comprising pressing an intimate admixture of cryptocrystalline magnesia and up to 1.5% of added aluminum compound calculated as $Al_2O_3$ and based on the total weight of the fired product, and firing said pressed admixture at a temperature of at least 1300° C. to form well-crystallized high purity periclase.

13. Process as in claim 12 wherein said aluminum compound is partially replaced by an iron compound dispersed in water and a chromium compound and the aluminum compound remaining is present in a minimum amount of on the order of about $\frac{1}{16}$% aluminum, calculated as $Al_2O_3$, based on the total weight of fired product.

14. Process as in claim 12 wherein up to 90% of finely divided well-crystallized periclase, based on the total weight of fired product, is admixed with said calcined mixture.

15. Process for preparing crystalline magnesia which comprises admixing a finely divided precipitated magnesium compound which will yield periclase upon firing containing at least 95% MgO and less than 2.0% CaO and less than 2.0% $SiO_2$, and a water dispersion of aluminum hydroxide in an amount which will provide up to 1.5% $Al_2O_3$, based on the total weight of the fired product, pressing, and firing said mixture to form high purity periclase.

16. Process for preparing crystalline magnesia which comprises intimately admixing a finely divided magnesium compound which yields periclase upon firing containing at least 95.0% MgO, less than 2.0% CaO and less than 2.0% $SiO_2$ and at least one aluminum compound chosen from the group consisting of alumina, aluminum hydroxide, aluminum sulfate, sodium aluminate, potassium aluminate, aluminum halide and aluminum phosphate, said aluminum compound being added in an amount to provide up to 1.5% aluminum calculated as $Al_2O_3$, based on the total weight of the fired product, and firing said admixture to form high-purity periclase containing less than 2.0% CaO and less than 2.0% $SiO_2$.

LESLIE W. AUSTIN.

References Cited in the file of this patent

UNITED STATES PATENTS

| Number | Name | Date |
|---|---|---|
| 1,312,871 | Pike | Aug. 12, 1919 |
| 1,527,347 | Browne | Feb. 24, 1925 |
| 2,280,515 | Ridgway et al. | Apr. 21, 1942 |
| 2,281,477 | Chesny | Apr. 28, 1942 |
| 2,447,412 | Heuer | Aug. 9, 1949 |
| 2,478,593 | Pike | Aug. 9, 1949 |
| 2,487,290 | Austin et al. | Nov. 8, 1949 |